United States Patent
Chong

(10) Patent No.: US 11,343,125 B2
(45) Date of Patent: May 24, 2022

(54) MULTIPLEXER WITH EMBEDDED EQUALIZATION

(71) Applicant: Euhan Chong, Ottawa (CA)

(72) Inventor: Euhan Chong, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/923,484

(22) Filed: Jul. 8, 2020

(65) Prior Publication Data

US 2022/0014399 A1    Jan. 13, 2022

(51) Int. Cl.
*H04L 25/03* (2006.01)

(52) U.S. Cl.
CPC .. *H04L 25/03057* (2013.01); *H04L 25/03343* (2013.01); *H04L 25/03885* (2013.01); *H04L 2025/03808* (2013.01)

(58) Field of Classification Search
CPC ......... H04L 25/03057; H04L 25/03343; H04L 25/03885; H04L 2025/03808
See application file for complete search history.

(56) References Cited

U.S. PATENT DOCUMENTS

| | | | |
|---|---|---|---|
| 8,705,602 B1 | 4/2014 | Ding et al. | |
| 10,153,922 B1 | 12/2018 | Sreeramaneni et al. | |
| 10,454,723 B1* | 10/2019 | Kossel | H04L 25/03057 |
| 2007/0121716 A1* | 5/2007 | Nagarajan | H03M 1/0682 |
| | | | 375/229 |
| 2008/0187036 A1* | 8/2008 | Park | H04L 25/03146 |
| | | | 375/233 |
| 2009/0110046 A1* | 4/2009 | Aziz | H04L 25/03006 |
| | | | 375/232 |
| 2009/0245343 A1* | 10/2009 | Iyer | H04L 25/03885 |
| | | | 375/232 |
| 2011/0096825 A1* | 4/2011 | Hollis | H03K 3/356113 |
| | | | 375/233 |

(Continued)

FOREIGN PATENT DOCUMENTS

CN    105099570 A    11/2015

OTHER PUBLICATIONS

Christian Menolfi, "A 112Gb/s 2.6pJ/b 8-Tap FFE PAM-4 SST TX in 14nm CMOS"; 2018 IEEE International Solid-State Circuits Conference; Feb. 12, 2018.

*Primary Examiner* — Freshteh N Aghdam

(57) ABSTRACT

There is provided a method including receiving, by a multiplexer, input signals having a first rate, applying, by an equalizer in the multiplexer, equalization on the input signals passed through respective signal paths in the multiplexer, and outputting, by the multiplexer, an output signal comprising a selected signal of equalized versions of the input signals produced by the equalization, the output signal having a second rate greater than the first rate. There is further provided a device that includes a multiplexer and a signal driver having an input connected to the output of the equalizer. The multiplexer includes a plurality of inputs to receive respective input signals, an output to provide an output signal selected from among the input signals, and an equalizer to apply equalization on the input signals that are passed through the multiplexer, the equalization to provide the selected signals as equalized signals at the output of the multiplexer.

20 Claims, 8 Drawing Sheets

(56) References Cited

U.S. PATENT DOCUMENTS

| | | | |
|---|---|---|---|
| 2013/0156087 A1* | 6/2013 | Erba | H04L 25/03885 375/233 |
| 2016/0359645 A1* | 12/2016 | Mukherjee | H04L 25/03057 |
| 2017/0070405 A1 | 3/2017 | Hashemi et al. | |
| 2018/0006799 A1* | 1/2018 | Yadav | H04L 7/033 |
| 2018/0302214 A1* | 10/2018 | Terlemez | H04L 7/0334 |
| 2020/0287576 A1* | 9/2020 | Farzan | H03M 1/662 |

* cited by examiner

| Description | MUX with embedded EQ (Proposed Solution) | | MUX + EQ in predriver | | Gated MUX driving 1 unit slice | | Gated MUX driving 4 unit slices | |
|---|---|---|---|---|---|---|---|---|
| | MUX Driving 4 unit slices | Equivalent 32x driver | MUX Driving 4 unit slices | Equivalent 32x driver | MUX Driving 1 unit slice | Equivalent 32x driver | MUX Driving 4 unit slices | Equivalent 32x driver |
| # of MUXes | 1 | 8 | 1 | 8 | 1 | 32 | 1 | 8 |
| Predriver Dimensions | None | | 2 stages + EQ | | None | | None | |
| Jitter at TX output (ps) 802 | 0.27 | | 0.72 | | 0.47 | | 3.4 | |
| Sensivity to Supply Noise (fs/mV) | 1.8 | | 18 | | | | | |
| MUX + Driver Current Consumption (mA) 804 | 2.2 | 21.1 | 2.3 | 23.1 | 1.6 | 59.0 | 1.6 | 18.2 |

FIG. 8

MULTIPLEXER WITH EMBEDDED EQUALIZATION

FIELD OF THE INVENTION

The present invention generally pertains to the field of electronics, and in particular to a method and apparatus for reducing jitter in signals transmitted over a signal link.

BACKGROUND

A transmission device can include a transmitter to transmit signals over a signal link. For example, the signal link can include signal traces on a circuit board, signal wires, a signal cable, and so forth. In some cases, signals transmitted over a signal link may have large voltage swings and/or have high frequencies.

It may be desirable to achieve low power in transmitters that transmit signals over signal links. Power consumption can depend on circuitry used in the transmitters. For example, if a transmitter uses a larger number of multiplexers, then the transmitter may consume a larger amount of power.

Signals transmitted over a signal link may experience jitter, which refers to a phenomenon where the transmitted signal deviates from a periodicity of the transmitted signal (assuming the transmitted signal is a periodic signal). A transmitted signal can exhibit increased jitter as signal periodicity decreases.

Jitter may be caused by inter-symbol interference (ISI). As a signal travels over a signal link, a signal pulse of the signal may spread beyond an allotted time interval of the signal pulse (where the allotted time interval is based on the periodicity of the signal) and into neighboring time intervals, which can cause interference with signal pulses in neighbouring time intervals. This effect is referred to as ISI.

A multiplexer can be used to increase a signal rate of signals that are output by a transmitter. A multiplexer can receive input signals that are at a first signal rate (e.g., a half signal rate) that is lower than a second signal rate (e.g., a full signal rate) of signals output by the transmitter. A "full signal rate" refers to a target rate at which signals are transmitted by a transmitter within a given time interval. A "half signal rate" refers to a rate of signal communication that is half the target rate.

To achieve lower jitter, an increased number of multiplexers can be employed in a transmitter. In some cases, a multiplexer is able to drive a relatively low load. If a signal driver of a multiplexer has a relatively high load (based on the input capacitance of the multiplexer), then a larger number of multiplexers can be used to drive the signal driver. However, increasing the number of multiplexers in a transmitter can lead to increased power consumption of the transmitter.

Accordingly, there may be a need for devices and methods for reducing jitter in a signal that is not subject to one or more limitations of the prior art.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

In accordance with some implementations of the present disclosure, to reduce jitter at an output of a transmitter, a multiplexer used in the transmitter can include an equalizer to equalize signals passed through multiple signal paths inside the multiplexer. In some examples, the multiplexer including the equalizer is part of the last output stage of the transmitter. The multiplexer can be used to drive the input of a signal driver that drives signals onto a signal link.

By including the equalizer in the multiplexer, ISI can be reduced, which reduces the amount of jitter of transmitted signals from the transmitter. Including the equalizer in the multiplexer can reduce the number of pre-driver stages that are included in the transmitter, which thereby can reduce power consumption of the transmitter.

In accordance with an aspect of the present disclosure there is provided a transmitter that includes a multiplexer. The multiplexer includes a plurality of inputs to receive respective input signals. The multiplexer further includes an output to provide an output signal selected from among the input signals. The multiplexer further includes an equalizer to apply equalization on the input signals that are passed through the multiplexer, the equalization to provide the selected signals as equalized signals at the output of the multiplexer.

In accordance with another aspect of the present disclosure there is provided a method that includes receiving, by a multiplexer, input signals having a first rate. The method further includes applying, by an equalizer in the multiplexer, equalization on the input signals passed through respective signal paths in the multiplexer. The method further includes outputting, by the multiplexer, an output signal including a selected signal of equalized versions of the input signals produced by the equalization, the output signal having a second rate greater than the first rate.

In accordance with another aspect of the present disclosure there is provided a device that includes a multiplexer and a signal driver having an input connected to the output of the equalizer. The multiplexer includes a plurality of inputs configured to receive respective input signals. The multiplexer further includes an output configured to provide an output signal selected from among the input signals. The multiplexer further includes an equalizer configured to apply equalization on the input signals that are passed through the multiplexer, the equalization to provide the selected signals as equalized signals at the output of the multiplexer.

In some embodiments the multiplexer is controllable by clock signals having a frequency less than a frequency of an output signal from the output. In some embodiments the clock signals includes a first clock signal and a second clock signal that is an inverse of the first clock signal. In some embodiments the multiplexer includes a first signal path for a first input signal of the input signals, and a second signal path for a second input signal of the input signals. In some embodiments the first signal path includes a first buffer having an input connected to the first input signal, and an output connected to a first tap node, and wherein the second signal path comprises a second buffer having an input connected to the second input signal, and an output connected to a second tap node. The equalizer includes a first delay circuit to delay the second input signal and output a delayed version of the second input signal to the first tap node. The equalizer further includes a second delay circuit to delay the first input signal and output a delayed version of the first input signal to the second tap node. In some embodiments the first delay circuit includes a buffer having an adjustable strength and the second delay circuit comprises a buffer having an adjustable strength. In some embodiments the first buffer has an adjustable strength and the second buffer has an adjustable strength. In some embodiments the transmitter further includes a driver having an input connected to the output of the multiplexer, wherein the adjustable strength of the buffer in the first delay circuit and the adjustable strength of the buffer in the second delay circuit are based on a load of the driver. In some embodiments the output of the buffer in the first delay circuit is tri-stated when the buffer in the first delay circuit is disabled in order to turn off equalization in the first signal path. In some embodiments the first signal path comprises a first series of buffers including the buffer with the adjustable strength in the first signal path as a last buffer in the first series of buffers and the second signal path includes a second series of buffers including the buffer with the adjustable strength in the second signal path as a last buffer in the second series of buffers. In some embodiments the first tap node is connected to an input of a first switch in the first signal path and the second tap node is connected to an input of a second switch in the second signal path. In some embodiments the first switch is clocked by a first clock signal and the second switch is clocked by a second clock signal that is offset from the first clock signal by a non-zero offset time interval. In some embodiments the first clock signal retimes, relative to the first input signal passed through the first signal path and equalized at the first tap node, a first output signal from the first switch. In some embodiments, the second clock signal retimes, relative to the second input signal passed through the second signal path and equalized at the second tap node, a second output signal from the second switch.

In some embodiments the equalization applied by the equalizer on a first input signal of the input signals includes outputting a buffered version of the first input signal at a first tap node, and outputting a delayed version of a second input signal of the input signals at the first tap node. In some embodiments the method further includes receiving, by a switch, a combined signal at the first tap node, the combined signal based on a combination of the buffered version of the first input signal and the delayed version of the second input signal; and outputting, by the switch as controlled by a clock signal running at the first rate, the combined signal as the output signal from the multiplexer. In some embodiments the clock signal retimes the output signal at an output of the multiplexer relative to the combined signal at the first tap node.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Some aspects and embodiments of the present invention may be suitable to be implemented as electronic components both small in size and suitable for low cost manufacturing processes. Embodiments may also be implemented over a wide frequency range, and with low power consumption.

BRIEF DESCRIPTION OF THE FIGURES

Further features and advantages of the present invention will become apparent from the following detailed description, taken in combination with the appended drawings, in which:

FIG. 8 depicts a table of values for multiplexers with and without embedded equalization in accordance with embodiments.

DETAILED DESCRIPTION

Voltage mode transmitters are typically used in high speed communication links to achieve wide voltage swing and large voltage boost on the transmitted bit stream. However, as a signal travels over a signal link, a signal pulse of the signal may spread beyond an allotted time interval of the signal pulse (where the allotted time interval is based on the periodicity of the signal) and into neighboring time intervals. The signal spread can cause interference with signal pulses in neighboring time intervals. This effect is referred to as inter-symbol interference (ISI), which in turn causes jitter in the signal. To achieve lower jitter, an increased number of multiplexers may be used in a transmitter. In some cases, a multiplexer is able to drive a relatively low load, and if a signal driver of a multiplexer has a relatively high load (based on the input capacitance of the multiplexer), a larger number of multiplexers can be used to drive the signal driver. However, increasing the number of multiplexers in a transmitter can lead to increased power consumption of the transmitter. Minimizing power and minimizing jitter at the output are parameters considered for the design of components such as voltage mode transmitters.

Embodiments of the present disclosure provide devices and methods for lowering jitter in a signal, while also minimizing power consumption.

Figure 1:
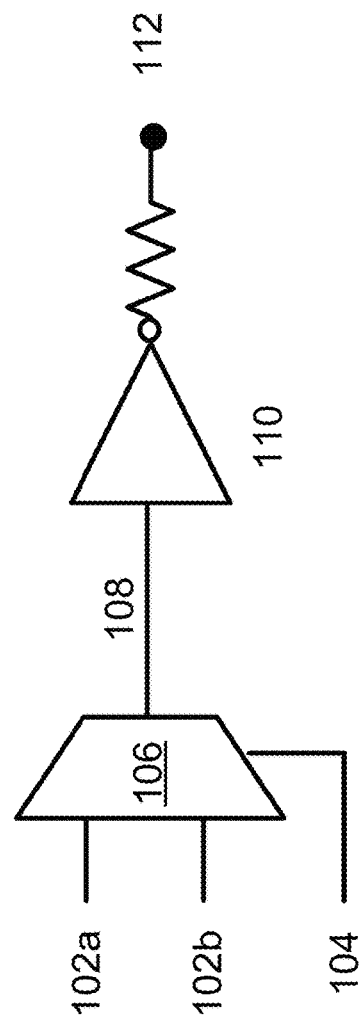
FIG. 1 illustrates a 2:1 multiplexer schematic configured in accordance with embodiments of the present disclosure.

FIG. 1 illustrates a 2:1 multiplexer schematic 100 configured in accordance with embodiments of the present disclosure. Input data signals 102a and 102b at half-rate are provided to the multiplexer 106. A clock signal 104 is also provided to the multiplexer 106. The multiplexer output 108 is provided to a unit driver cell 110, from where it is eventually output as transmission 112. While only one unit driver cell 110 is depicted, each multiplexer 106 may drive a certain number of unit driver cells 110. Typically, a total of 32 unit driver cells 110 is needed to for a 50 Ohm driver. The final 50 Ohm driver includes multiple multiplexers 106 and unit driver cells 110 in parallel. In a T-gate scheme, the half-rate data can be provided by input data signals 102a and 102b and the full-rate data can be generated at output, retimed by half-rate clock signal 104.

Figure 2:
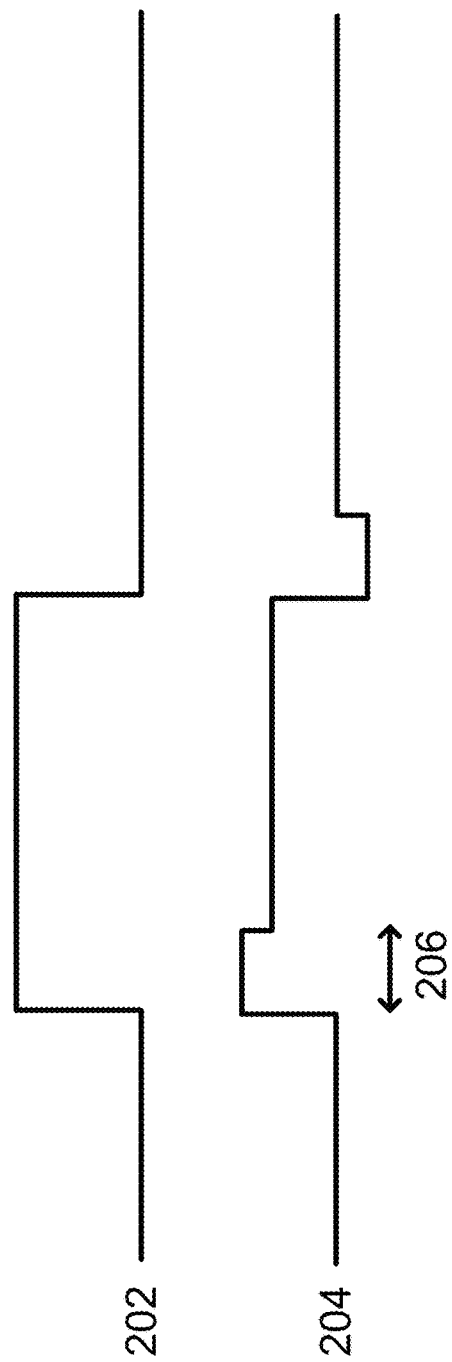
FIG. 2 illustrates graphs of signal amplitude illustrating features of equalization in accordance with embodiments.

FIG. 2 illustrates graphs of signal amplitude illustrating features of equalization in accordance with embodiments. Graph 202 illustrates a multiplexer output without equalization, while graph 204 illustrates a multiplexer output with 1-tap feed-forward equalization (FFE). One unit interval (UI) is illustrated as 206. The equalization is equivalent to T-spaced FFE, but generated inside the multiplexer. This may be achieved by generating the appropriate signal levels before the T-gate in the multiplexer. The clock may then sample the signal and generate the full-data at the multiplexer output.

Figure 3:
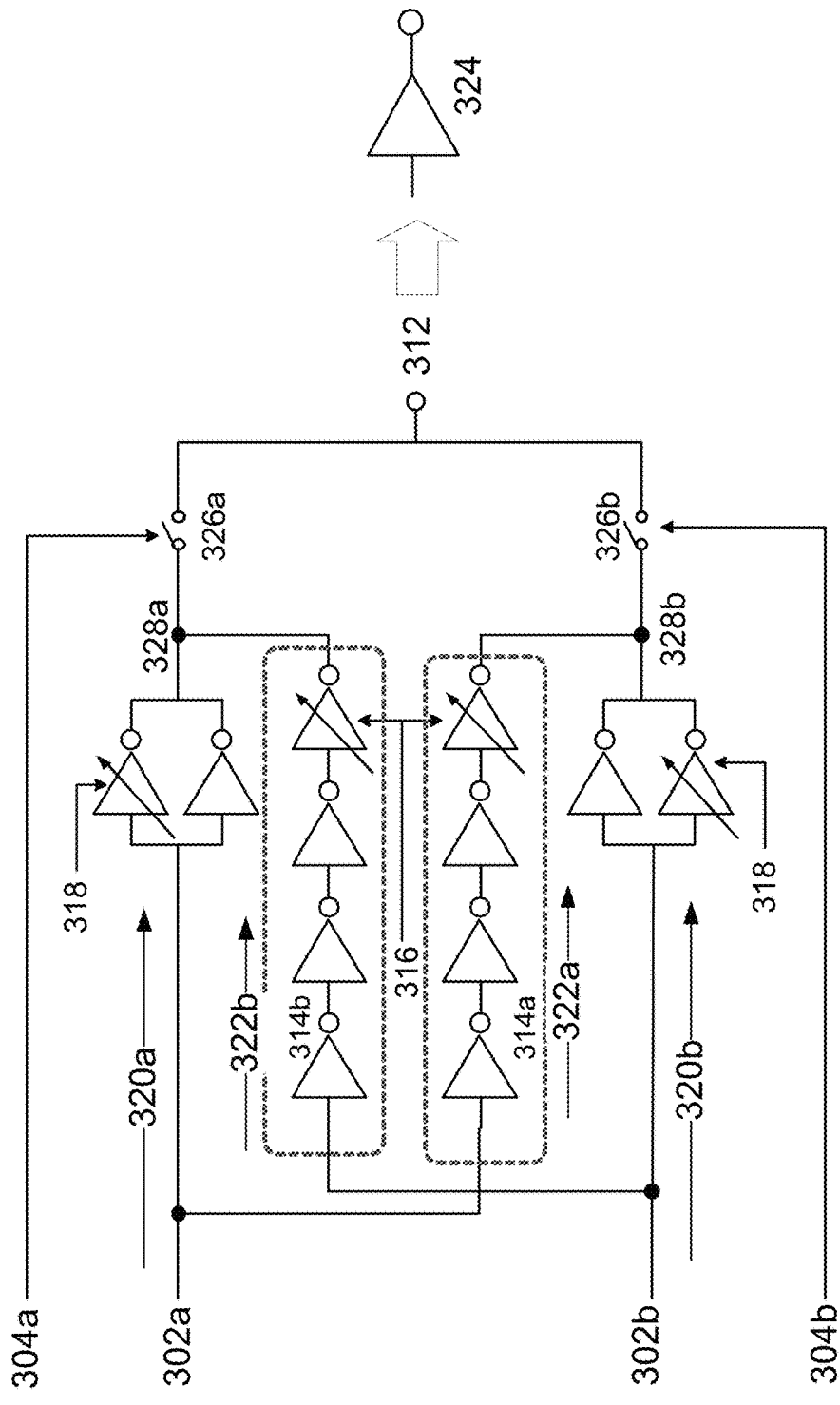
FIG. 3 illustrates an example 2:1 multiplexer schematic configured to include to perform equalization in the multiplexer in accordance with embodiments.

FIG. 3 illustrates an example 2:1 multiplexer schematic 300 configured to include to perform equalization in the multiplexer in accordance with embodiments. Input data signals 302a and 302b at half-rate are provided to the multiplexer, along with clock signals 304a and 304b. The UI delay 314 is approximately one unit in the post-cursor path 322. Path strengths 316 and 318 are also depicted. The multiplexer output 312 may then be forwarded to a driver 324, such as a 50 Ohm driver.

In some embodiments, the multiplexer 300 may be controllable by clock signals 304a and 304b having a frequency less than the frequency of the output signal from the output 312. The clock signals 304a and 304b may be a first clock signal and a second clock signal, where one clock signal is the inverse of the other clock signal. The multiplexer 300 may include a first signal path for a first input signal 302a of the input signals, and a second signal path for a second input signal 302b of the input signals. The first signal path may include a first buffer having an input connected to the first input signal 302a, and an output connected to a first tap node 328a. The second signal path may include a second buffer having an input connected to the second input signal 302b, and an output connected to a second tap node 328b. The equalizer may include a first delay circuit to delay the second input signal 302b and output a delayed version of the second input signal 302b to the first tap node 328a. The equalizer may further include a second delay circuit to delay the first input signal 302a and output a delayed version of the first input signal 302a to the second tap node 328b. The first tap node 328a may be connected to an input of a first switch 326a in the first signal path. The second tap node 328b may be connected to an input of a second switch 326b in the second signal path. One or both of the first delay circuit and second delay circuit may include a buffer having an adjustable strength. The multiplexer 300 may further include a driver 324 having an input connected to the output 312 of the multiplexer 300, wherein the adjustable strength of the buffer in the first delay circuit and the adjustable strength of the buffer in the second delay circuit are based on a load of the driver 324. In some embodiments the output of the buffer in the first delay circuit may be tri-stated when the buffer in the first delay circuit is disabled, to turn off equalization in the first signal path.

In some embodiments, the first signal path 320a may include a first series of buffers including the buffer with the adjustable strength in the first signal path 320a as a last buffer in the first series of buffers. The second signal path 320b may also include a second series of buffers including the buffer with the adjustable strength in the second signal path 320b as a last buffer in the second series of buffers.

In some embodiments, the first switch 326a may be clocked by a first clock signal 304a. Similarly, the second switch 326b may be clocked by a second clock signal 304b that is offset from the first clock signal 304a by a non-zero offset time interval. In some embodiments, the first clock signal 304a may retime, relative to the first input signal 302a passed through the first signal path and equalized at the first tap node 328a, a first output signal from the first switch 326a. Similarly, the second clock signal 304b may retime, relative to the second input signal 302b passed through the second signal path 320b and equalized at the second tap node 328b, a second output signal from the second switch 326b.

With continued reference to FIG. 3, the main inverter path 320a and 320b may be an 8× inverter followed by 8× T-gate. The multiplexer implements equalization similar to a 2-Tap feed-forward equalization (FFE) with one main tap and one post tap. Parallel switchable inverter slices may be connected to the main 8× inverter to adjust strength of main tap. There may be a one UI (approximately 18 ps) delay in the parallel path 322a and 322b to implement post-cursor tap. The final inverter strength in the post-cursor path 322a and 322b can be adjustable to adjust the post-cursor tap strength. For lower data-rates, additional delay may be switched in, but this additional delay may not be necessary. With lower data-rates, little to no equalization may be necessary. The signal level of the FFE can be generated by voltage division between the main path 320a and 320b, and the post-cursor path 322a and 322b inverters, respectively. The final T-gate samples the data level at the appropriate time to generate the full-rate data. As the clock 304a and 304b also re-times the data, timing of the main-path 320 and delayed post-cursor path 322 is not critical—it may only need to satisfy the minimum setup time.

Figure 4B:
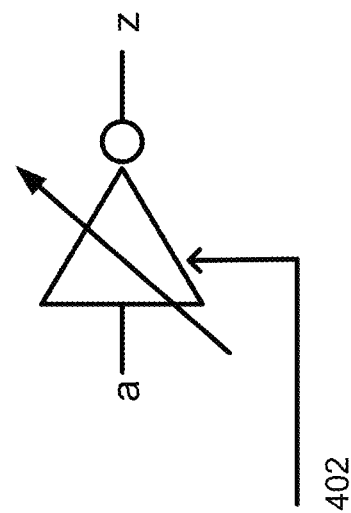
FIGS. 4A and 4B illustrate an example schematic of a 3-bit adjustable inverter in accordance with embodiments.
Figure 4A:
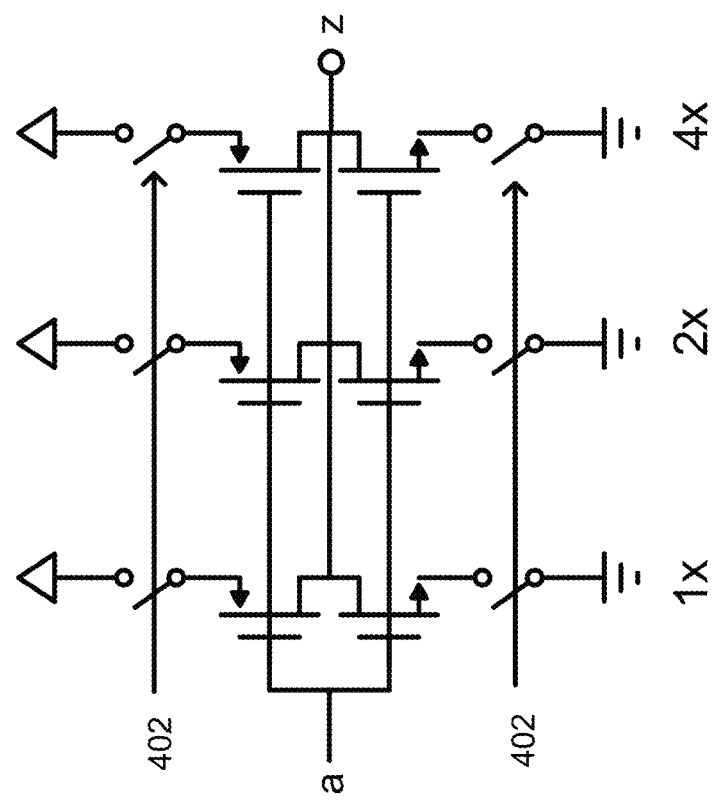

FIGS. 4A and 4B illustrate an example schematic 400 of a 3-bit adjustable inverter in accordance with embodiments. Control paths 402 are also depicted. The main path 320 and the post-cursor path 322 have similar 3-bit adjustable strength inverters. The main path 320 may have a maximum strength equivalent to approximately a 4× inverter, while the post stage may have a maximum strength equivalent to approximately an 8× inverter. The inverter may be disabled by putting it in tristate or high-Z when no equalization is needed.

A 2:1 multiplexer, such as that represented in FIG. 1, may be directly followed by 4 unit drive slices. There are 32 unit driver slices required to produce 50 Ohm termination. Thus, if each multiplexer is able to drive 4 unit drive slices, a total of eight multiplexers would be required for a 50 Ohm driver.

With four unit driver slices connected to the multiplexer, an equalization setting of 4 can be desired and this configuration can result in a low ISI multiplexer output.

Figure 5A:
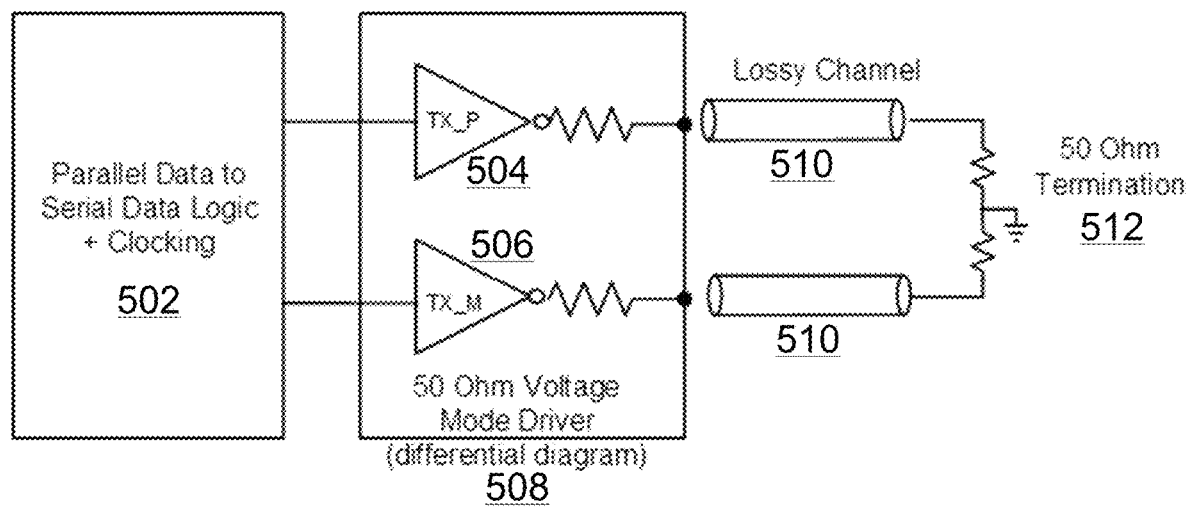
FIGS. 5A and 5B depict top-level diagrams of devices configured in accordance with embodiments.
Figure 5B:
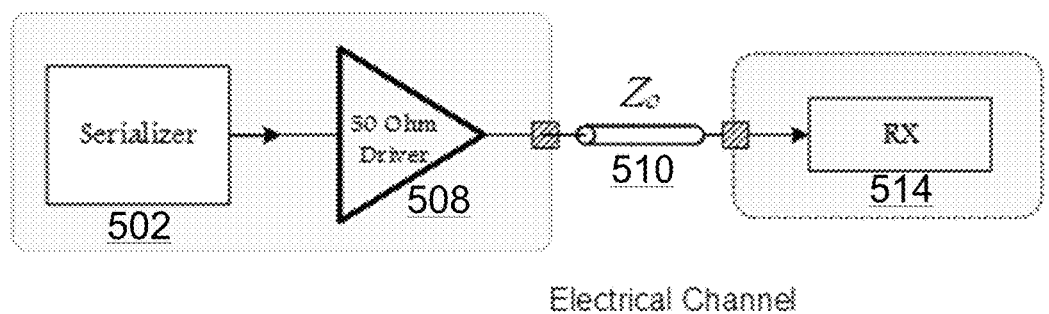

FIGS. 5A and 5B depict top-level diagrams of devices configured in accordance with embodiments. In FIG. 5A, serializer 502 transmits data to a 50 Ohm voltage mode driver 508, which includes a post-cursor transmission 504 and a main transmission 506. A person having skill in the art will appreciate that a serializer includes a multiplexer for clocking out the parallel data serially, such as, for example, the multiplexer 100 depicted in FIG. 1. From the driver 508, the data travels to lossy channels 510, and finally to a 50 Ohm termination 512. Similarly, FIG. 5B depicts a 100+Gb transmission scenario in which the data received by a receiving component 514, instead of going to a 50 Ohm termination 512.

Figure 6:
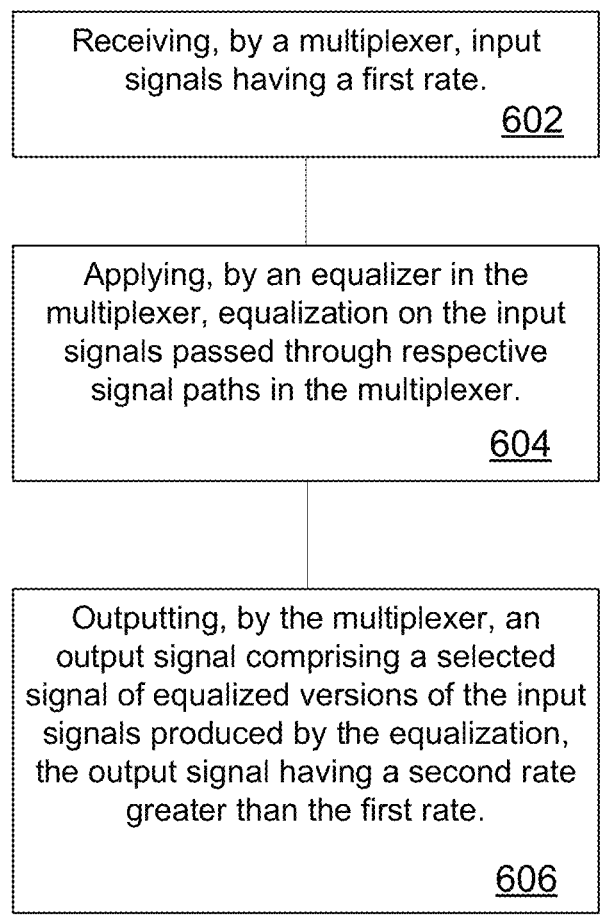
FIG. 6 depicts the method of operation of a multiplexer configured in accordance with embodiments.

FIG. 6 depicts the method 600 of operation of a multiplexer configured in accordance with embodiments. The method includes receiving 602, by a multiplexer, input signals having a first rate. The method further includes applying 604, by an equalizer in the multiplexer, equalization on the input signals passed through respective signal paths in the multiplexer. In addition, the method includes outputting 606, by the multiplexer, an output signal comprising a selected signal of equalized versions of the input signals produced by the equalization, the output signal having a second rate greater than the first rate.

In accordance with embodiments, the equalization applied by the equalizer on a first input signal may include outputting a buffered version of the first input signal at a first tap node, and outputting a delayed version of a second input signal of the input signals at the first tap node. The method 600 may further include receiving, by a switch, a combined signal at the first tap node, the combined signal based on a combination of the buffered version of the first input signal and the delayed version of the second input signal; and outputting, by the switch as controlled by a clock signal running at the first rate, the combined signal as the output signal from the multiplexer. In some embodiments, the clock signal may retime the output signal at an output of the multiplexer relative to the combined signal at the first tap node.

Figure 7A:
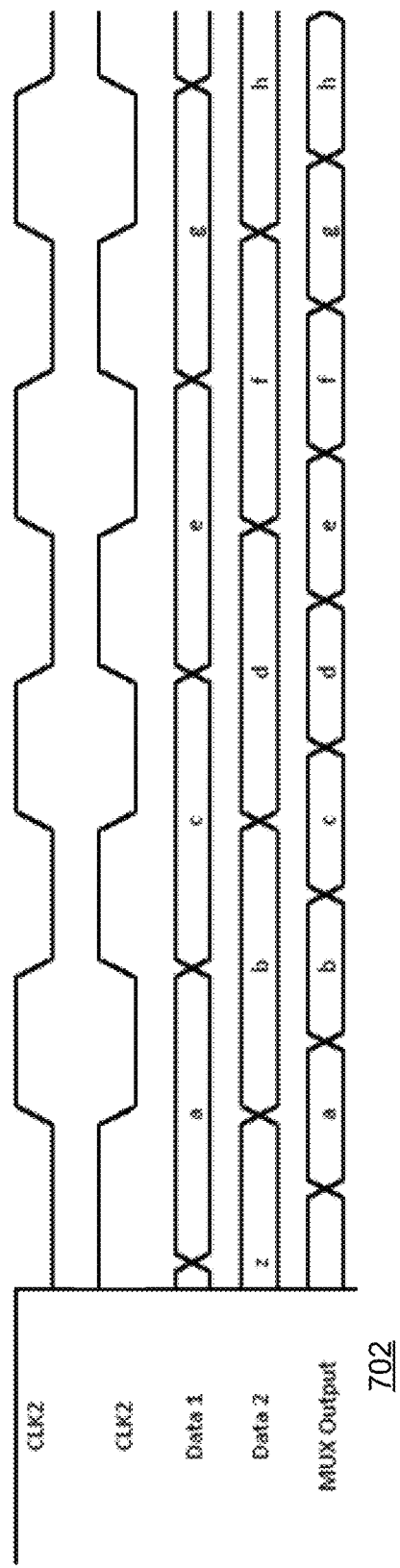
FIGS. 7A and 7B illustrate the multiplexer timings in operation in accordance with embodiments.
Figure 7B:
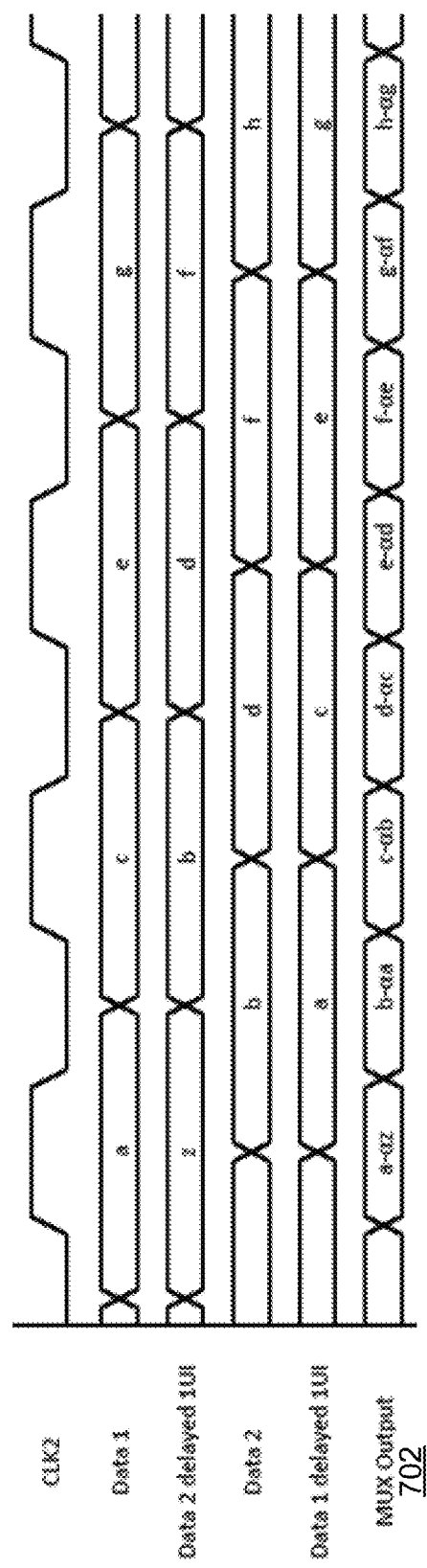

FIGS. 7A and 7B illustrate the multiplexer timings during operation in accordance with embodiments. In FIG. 7A, the timings are for a multiplexer without equalization, whereas in FIG. 7B, the multiplexer performs equalization. The "alpha" term in the MUX Output 702 of FIG. 7B is the scaling factor that affects how much equalization is applied to the main data or cursor.

FIG. 8 depicts a table of values for multiplexers with and without embedded equalization in accordance with embodiments. It is evident that both the jitter at transmission 802 and the multiplexer and driver current consumption 804 are reduced when equalization is configured within the multiplexer.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A transmitter comprising:
  a multiplexer including:
    a plurality of inputs configured to receive respective input signals;
    an output configured to provide an output signal selected from among the input signals; and
    an equalizer configured to apply equalization on the input signals that are passed through the multiplexer, the equalization to provide the selected signals as equalized signals at the output of the multiplexer, wherein the equalization applied by the equalizer on a first input signal of the input signals comprises:
      outputting a buffered version of the first input signal at a first tap node, and
      outputting a delayed version of a second input signal of the input signals at the first tap node, wherein the second input signal is different from the first input signal.

2. The transmitter of claim 1, wherein the multiplexer is controllable by clock signals having a frequency less than a frequency of an output signal from the output.

3. The transmitter of claim 2, wherein the clock signals comprise a first clock signal and a second clock signal, wherein the second clock signal is an inverse of the first clock signal.

4. The transmitter of claim 2, wherein the multiplexer comprises a first signal path for the first input signal of the input signals and a second signal path for the second input signal of the input signals.

5. The transmitter of claim 4, wherein the first signal path comprises a first buffer having an input connected to the first input signal and an output connected to the first tap node, and wherein the second signal path comprises a second buffer having an input connected to the second input signal and an output connected to a second tap node; and
  wherein the equalizer comprises:
    a first delay circuit to delay the second input signal and output the delayed version of the second input signal to the first tap node; and
    a second delay circuit to delay the first input signal and output the delayed version of the first input signal to the second tap node.

6. The transmitter of claim 5, wherein the first delay circuit comprises a buffer having an adjustable strength and the second delay circuit comprises a buffer having an adjustable strength.

7. The transmitter of claim 6, further comprising a driver having an input connected to the output of the multiplexer;
  wherein the adjustable strength of the buffer in the first delay circuit and the adjustable strength of the buffer in the second delay circuit are based on a load of the driver.

8. The transmitter of claim 6, wherein the output of the buffer in the first delay circuit is tri-stated when the buffer in the first delay circuit is disabled, to turn off equalization in the first signal path.

9. The transmitter of claim 6, wherein the first signal path comprises a first series of buffers including the buffer with the adjustable strength in the first signal path as a last buffer in the first series of buffers and the second signal path comprises a second series of buffers including the buffer with the adjustable strength in the second signal path as a last buffer in the second series of buffers.

10. The transmitter of claim 5, wherein the first tap node is connected to an input of a first switch in the first signal path and the second tap node is connected to an input of a second switch in the second signal path.

11. The transmitter of claim 10, wherein the first switch is clocked by a first clock signal and the second switch is clocked by a second clock signal and wherein the first clock signal retimes a first output signal from the first switch, wherein the first output signal is retimed relative to the first input signal passed through the first signal path and equalized at the first tap node; and
  the second clock signal retimes a second output signal from the second switch, wherein the second output signal is retimed relative to the second input signal passed through the second signal path and equalized at the second tap node.

12. A method comprising:
  receiving, by a multiplexer, input signals having a first rate;
  applying, by an equalizer in the multiplexer, equalization on the input signals passed through respective signal paths in the multiplexer, wherein the equalization applied by the equalizer on a first input signal of the input signals comprises:
    outputting a buffered version of the first input signal at a first tap node, and
    outputting a delayed version of a second input signal of the input signals at the first tap node; and
  outputting, by the multiplexer, an output signal including a selected signal of equalized versions of the input signals produced by the equalization, the output signal having a second rate greater than the first rate, wherein the second input signal is different from the first input signal.

13. The method of claim 12, further comprising:
  receiving, by a switch, a combined signal at the first tap node, the combined signal based on a combination of the buffered version of the first input signal and the delayed version of the second input signal; and outputting, by the switch as controlled by a clock signal running at the first rate, the combined signal as the output signal from the multiplexer.

14. The method of claim 13, wherein the clock signal retimes the output signal at an output of the multiplexer relative to the combined signal at the first tap node.

15. A device comprising:
a multiplexer including:
a plurality of inputs to receive respective input signals;
an output to provide an output signal selected from among the input signals;
an equalizer to apply equalization on the input signals that are passed through the multiplexer, the equalization to provide the selected signals as equalized signals at the output of the multiplexer, wherein the equalization applied by the equalizer on a first input signal of the input signals comprises:
outputting a buffered version of the first input signal at a first tap node, and
outputting a delayed version of a second input signal of the input signals at the first tap node; and
a signal driver having an input connected to the output of the equalizer, wherein the second input signal is different from the first input signal.

16. The device of claim 15, wherein the multiplexer comprises a first signal path for the first input signal of the input signals and a second signal path for the second input signal of the input signals, wherein the first signal path includes a first buffer having an input connected to the first input signal and an output connected to a first tap node, and wherein the second signal path includes a second buffer having an input connected to the second input signal and an output connected to a second tap node; and
wherein the equalizer includes:
a first delay circuit to delay the second input signal and output the delayed version of the second input signal to the first tap node; and
a second delay circuit to delay the first input signal and output the delayed version of the first input signal to the second tap node.

17. The device of claim 15, wherein the first delay circuit comprises a buffer having an adjustable strength and the second delay circuit comprises a buffer having an adjustable strength.

18. The device of claim 15, wherein the multiplexer is controllable by clock signals having a frequency less than a frequency of an output signal from the output.

19. The device of claim 15, wherein the clock signals comprise a first clock signal and a second clock signal, wherein the second clock signal is an inverse of the first clock signal.

20. The device of claim 15, wherein the multiplexer comprises a first signal path for the first input signal of the input signals and a second signal path for the second input signal of the input signals.

* * * * *